US007494138B2

(12) United States Patent
Graham

(10) Patent No.: US 7,494,138 B2
(45) Date of Patent: Feb. 24, 2009

(54) BIPEDAL MOTION ASSISTING METHOD AND APPARATUS

(76) Inventor: Gary Graham, P.O. Box 5146, Glacier, WA (US) 98244

(*) Notice: Subject to any disclaimer, the term of this patent is extended or adjusted under 35 U.S.C. 154(b) by 68 days.

(21) Appl. No.: 11/535,039

(22) Filed: Sep. 25, 2006

(65) Prior Publication Data

US 2008/0079230 A1 Apr. 3, 2008

(51) Int. Cl.
*B62M 1/00* (2006.01)
*B62B 5/06* (2006.01)
*A61H 3/00* (2006.01)

(52) U.S. Cl. ............................... 280/87.021; 280/304.5

(58) Field of Classification Search ............ 280/87.021, 280/304.5, 87.05, 42, 250.1, 62, 282; 135/67, 135/66; 482/68, 67, 66; 297/5, 6, DIG. 4; 188/29, 74

See application file for complete search history.

(56) References Cited

U.S. PATENT DOCUMENTS

| | | | | |
|---|---|---|---|---|
| 1,307,058 | A | 6/1919 | McGrath | |
| 2,847,057 | A * | 8/1958 | Holcombe | 482/68 |
| 4,226,413 | A | 10/1980 | Daugherty | |
| 4,239,248 | A | 12/1980 | Ewers | |
| 4,312,505 | A | 1/1982 | Engelhart | |
| 4,813,664 | A | 3/1989 | Vroulis | |
| 4,907,794 | A | 3/1990 | Rose | |
| 5,020,560 | A * | 6/1991 | Turbeville | 135/67 |
| 5,158,313 | A * | 10/1992 | Becker | 280/87.021 |
| 5,378,215 | A | 1/1995 | Harkins | |
| 5,538,268 | A * | 7/1996 | Miller | 280/87.05 |
| 5,676,388 | A | 10/1997 | Bertani | |
| 6,070,603 | A * | 6/2000 | Politz | 135/67 |
| 6,220,612 | B1 | 4/2001 | Beleski | |
| 6,296,263 | B1 | 10/2001 | Schultz | |
| 6,554,302 | B1 | 4/2003 | Liu | |
| 6,688,633 | B2 * | 2/2004 | van't Schip | 280/642 |
| 6,712,744 | B2 * | 3/2004 | Buechel et al. | 482/142 |
| 7,040,637 | B2 * | 5/2006 | Owens et al. | 280/87.021 |
| 7,111,856 | B1 * | 9/2006 | Graham | 280/87.021 |
| 7,377,285 | B2 * | 5/2008 | Karasin et al. | 135/67 |

OTHER PUBLICATIONS

Catalogue Advertisement: Get Post-Op Clients Back on Their Feet with the Eva Support Walker, p. 149-156 Published in United States.

* cited by examiner

*Primary Examiner*—Hau V Phan
(74) *Attorney, Agent, or Firm*—Michael F. Hughes; Hughes Law Firn, PLLC

(57) ABSTRACT

A mobile support system having a central region that allows the legs to move in an unobstructed manner and providing an upper body support assembly where the weight is distributed between the elbow region and hand region of the individual for a desirable weight distribution for assisted bipedal motion such as walking or running.

20 Claims, 16 Drawing Sheets

BIPEDAL MOTION ASSISTING METHOD AND APPARATUS

RELATED APPLICATIONS

This application claims priority benefit of U.S. Ser. No. 60/509,195, filed Oct. 6, 2003, U.S. Ser. No. 10/960,364 filed Oct. 6, 2004, and U.S. Ser. No. 60/567,046, filed Apr. 29, 2004.

BACKGROUND OF THE INVENTION

The area of use related to the apparatus shown below is to assist various individuals in bipedal motion such as walking and running. The apparatus shown below is particularly conducive for individuals that desire an active lifestyle but have mobility issues such as troubled joints or other ailments that do not allow them to fully support their own body weight upon their legs for the duration of time.

The apparatus shown below is particularly conducive for allowing the individual to run in that the weight of the individual is partially supported by the elbows and hands of the individual. Further, the center of gravity of the individual with respect to the support system is such that it is very desirable and comfortable for the individual to walk at a brisk pace or run and alter the amount of force distributed upon the upper body support system. The apparatus is particularly distinctive in that it does not have the appearance or functional feel of a clinical hospital-type device, but rather is very conducive overall to an active lifestyle.

In general, the prior art devices that are adapted to assist an individual conduct bipedal motion are not conducive for an individual with a more active lifestyle. These prior art devices utilize cumbersome structures that are not adequate to support the upper body of an individual.

SUMMARY OF THE INVENTION

This invention relates to a mobile support system having a longitudinal and lateral axis adapted to support an individual having a leg and right elbows and left and right hands. The mobile support system comprises a base frame which has a first lateral frame member and a second lateral frame member, the first and second lateral frame members forming a central unobstructed region adapted to provide free motion of the leg of the individual.

The mobile support system also comprises a wheel assembly attached to the base frame, which has a longitudinally rearward wheel subassembly and a longitudinal forward wheel subassembly, where the longitudinally rearward wheel subassembly comprises first and second longitudinally rearward wheels each having ground engagement locations, the longitudinally forward wheel subassembly having a ground engagement location that is positioned laterally between the ground engagement locations of first and second longitudinally rearward wheels.

In addition, the mobile support system comprises an upper body support assembly attached to the base frame, the upper body support assembly having an elbow support region comprising first and second elbow supports adapted to support the left and right elbows of the individual, and also having a support handle assembly comprising first and second support handles adapted to be grasped by left and right hands.

In addition, the body weight of the individual is adapted to be partially supported by the upper body support assembly whereby a portion of the weight is distributed to the elbow support region and a portion of the weight is distributed to the support handle assembly.

DETAILED DESCRIPTION OF THE PREFERRED EMBODIMENTS

Other prior art devices that support individuals for bipedal motion have employed a system for either providing vertical support on the hands or the armpit region in a similar manner as crutches. This method of support is wholly inadequate for long-term vertical support for the individual.

It should be noted that the directions forward and rearward relating to the longitudinal direction and lateral indicating a side-to-side direction are general indicators, and given the rotational nature of many of the components, moving in one direction may vector components in other directions. In other words, if a component repositions in the laterally inward direction, of course there may be other movement vectors such as in the longitudinal or perhaps vertical direction. The ground as discussed herein is any solid portion of the earth such as (but not limited to) pavement, interior flooring, outdoor dirt trails, etc.

Figure 1:
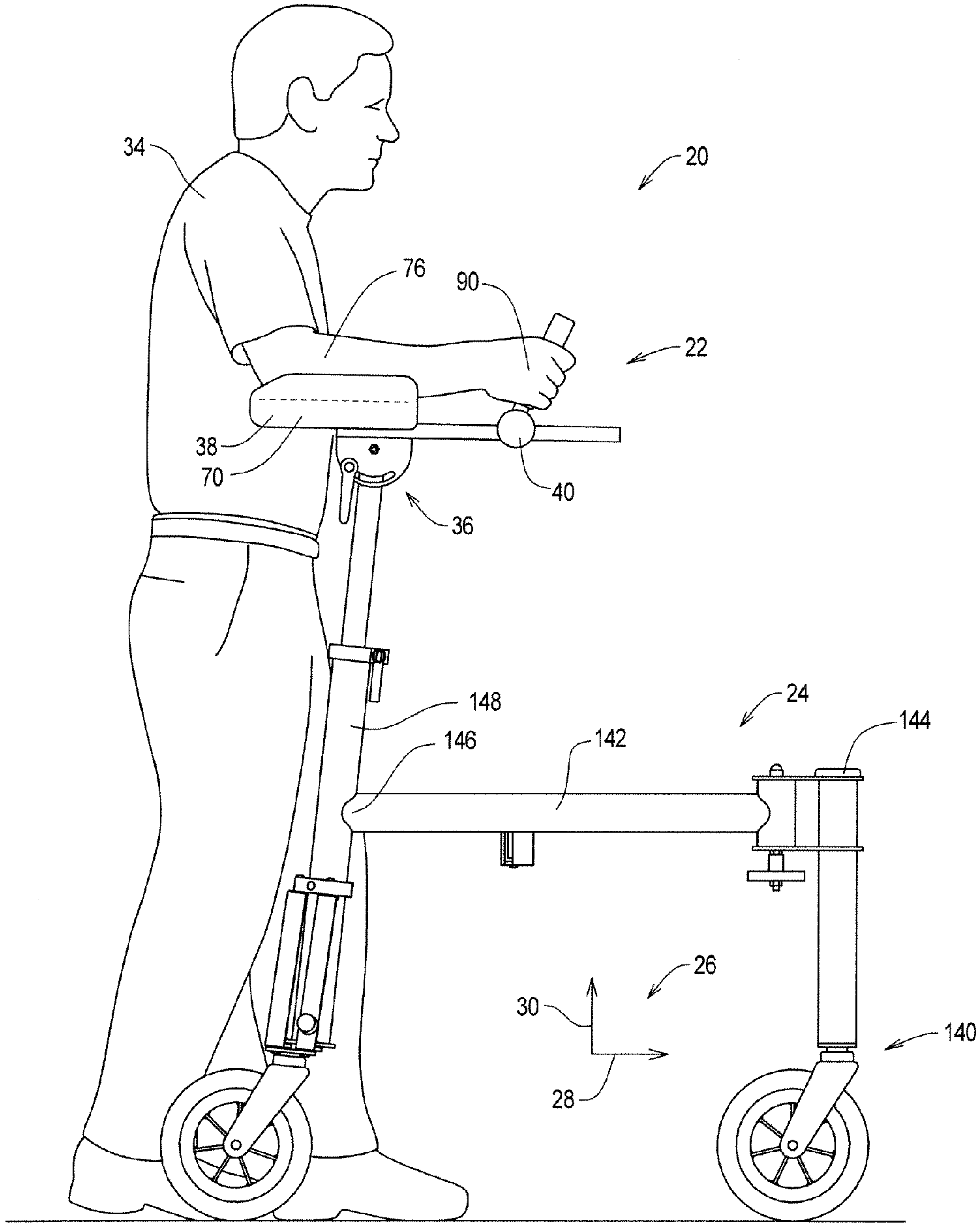
FIG. 1 is a side view of the mobile support system 20 with an individual utilizing the system.

As shown in FIG. 1, there is a mobile support system 20, the mobile support system comprising an upper body support assembly 22 and a base frame 24. An axis system 26 is defined whereby the axis 28 defines a longitudinal axis and the axis 30 indicates a vertical axis. Further, referring to FIG. 3, a lateral axis 32 is defined and is substantially orthogonal to axes 28 and 30. The arrow of the axis 32 indicates a first lateral direction pointing laterally outwardly and the opposite direction is defined as a second lateral direction.

The mobile support system 20 in general is adapted to assist an individual 34 to engage in bipedal motion with a certain degree of assistance. The individual in one form can be an elderly person that is not adapted to travel long distances by way of bipedal motion with either running or walking. Or alternatively, the individual 34 may be a person with some form of temporary injury who requires a certain degree of mobile assistance, or any other individual otherwise requiring or desiring some mobile support. The embodiments of the present invention are particularly conducive for a lightweight extremely mobile and comfortable system having a sportier design conducive for individuals 34 that desire to have a certain degree of activity.

Figure 2:
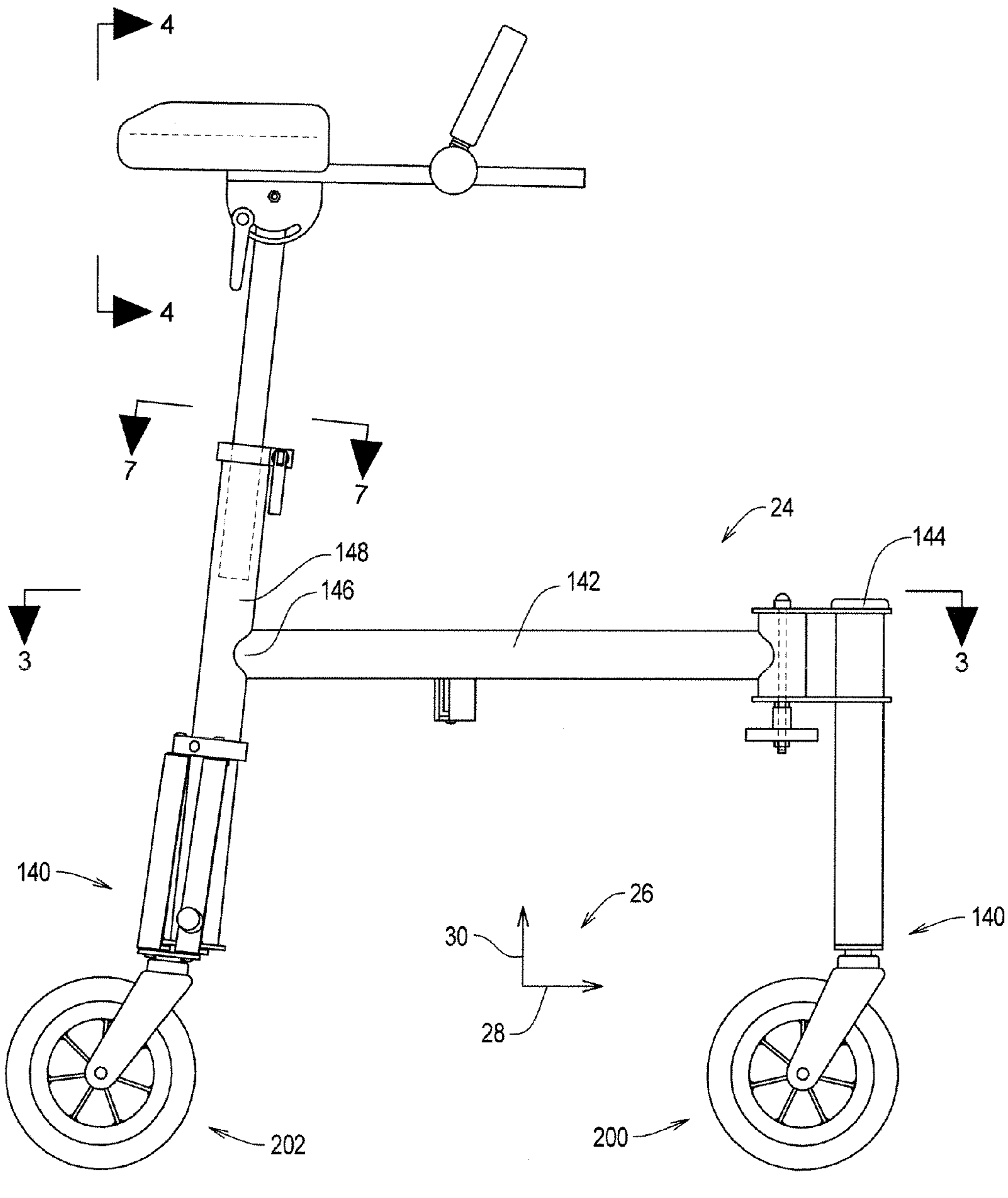
FIG. 2 is a side view of an embodiment of the mobile support system.
Figure 4:
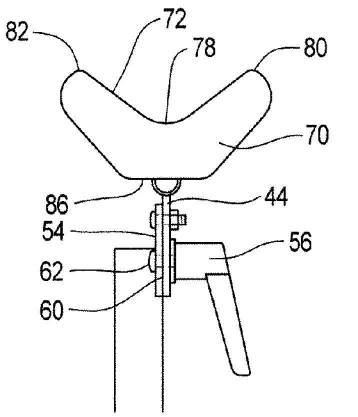
FIG. 4 is a rearward view taken at line 4-4 in FIG. 2 showing the upper body support assembly of the mobile support system.
Figure 5:
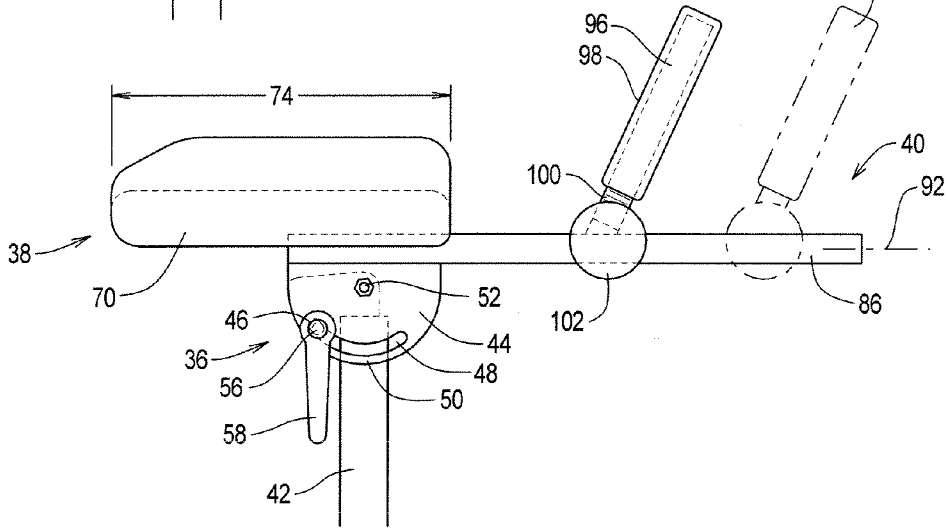
FIG. 5 is a side view of the upper body support assembly showing various positions of the support handle assembly.
Figure 28:
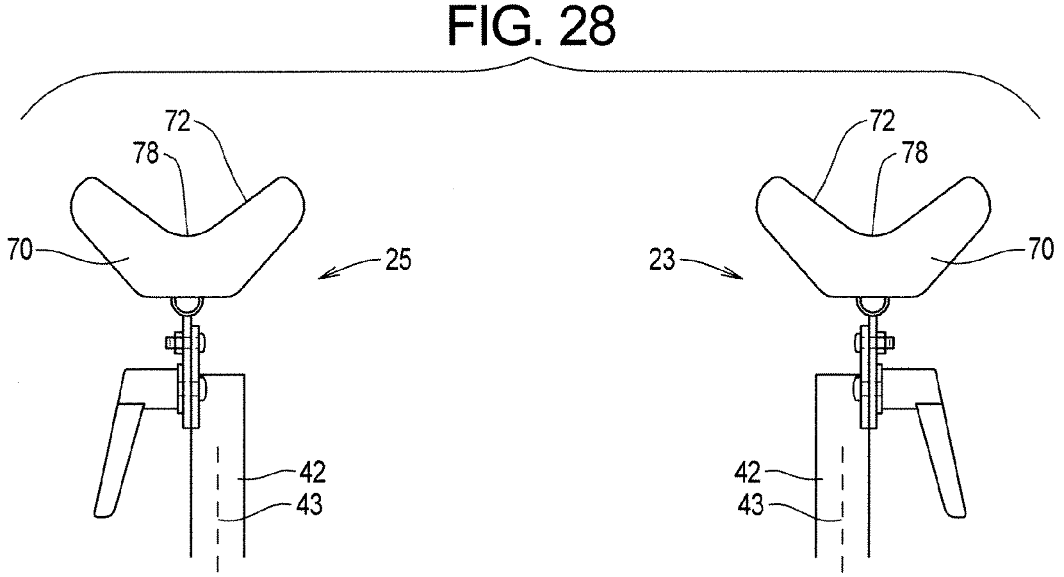
FIG. 28 shows one embodiment of the left and right elbow support members.

The upper body support assembly comprises a first support member 23 and a second support member 25 (see FIG. 28). As shown in FIG. 2, the 1st and 2nd support members (only the first support member is visible in FIG. 2) are adapted to be received by the base post 148 of the base frame 24. The upper body support assembly 22 comprises a pitch adjustment system 36, an elbow support region 38, and a support handle assembly 40. The pitch adjustment system 36 as shown in FIG. 5 comprises an extendable post 42 and a rotation plate 44. Further, the pitch adjustment system 36 comprises a locking member 46. The rotational plate 44 in one form comprises a partially circular annular slot 48 having a perimeter region 50 immediately adjacent to the annular slot 48 and having a surface bearing substantially in the lateral direction. The rotational plate 44 further comprises a pivot region 52 which in one form is a laterally extending pin of some sort or a nut and bolt assembly adapted to have the rotational plate 44 rotate therearound. As shown in FIG. 4, the rotational plate 44 is positioned adjacent to a base plate 54 that is fixedly connected to the extendable post 42. The locking member 46 in one form comprises an engagement member 56 having a handle region 58. The engagement member 56 is a standard frictional engagement type, and as shown in FIG. 4, has a laterally inward surface 60. As further shown in FIG. 4, the laterally extending pin 62 engages the baseplate 54 where the rotational plate 44 is interposed and frictionally and temporarily positioned between the baseplate 54 and the laterally inward surface 60. Therefore, by rotating and applying a torque to the handle region 58, the rotational plate 44 can be rotationally and fixedly positioned which has an effect on the low distribution between the elbows 76 and hands 90 of the individual 34 (see FIGS. 1 and 18) as described further herein. Of course other locking mechanisms such as any kind of pins, slots and extensions or other means that are foreseeable can be employed to rotate the pitch of the upper body support assembly 22.

The elbow support region 38 comprises first and second elbow pads. A first elbow pad 70 is shown in FIGS. 4 and 5. Referring to FIG. 4, the first elbow pad (which is similar to the second elbow pad except symmetrical about the center plane of the mobile support system extending in the vertical and longitudinal directions) comprises an upper contact surface 72. As shown in FIG. 5, the elbow pad 70 has a longitudinal length 74 that is sufficiently long to distribute the load along the elbow and upper forearms 76 of the individual 34 as shown in FIG. 1. As shown in FIG. 4, the upper surface 72 has a central vertically lower region 78, a first lateral upper region 80, and a second laterally upper region 82. The regions 78, 80 and 82 are of a concave nature to support the elbow and upper forearm 76 of the individual (see FIG. 1). The lower portion of the elbow pad 70 is fixedly attached to the base region 86. The longitudinal length dimension 74 can roughly extend between 4 inches and 12 inches in one form and a more preferred range of about 8 inches in length.

Figure 26:
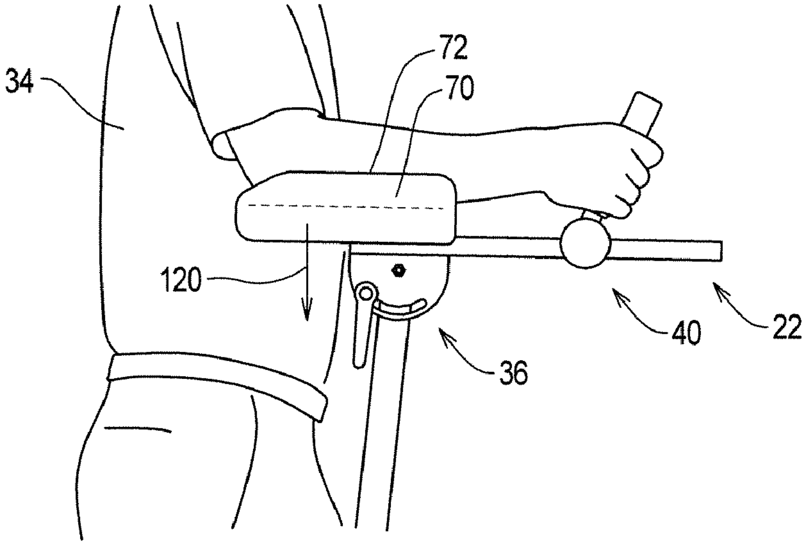
FIG. 26 shows one angle of usage of the upper body support assembly.
Figure 27:
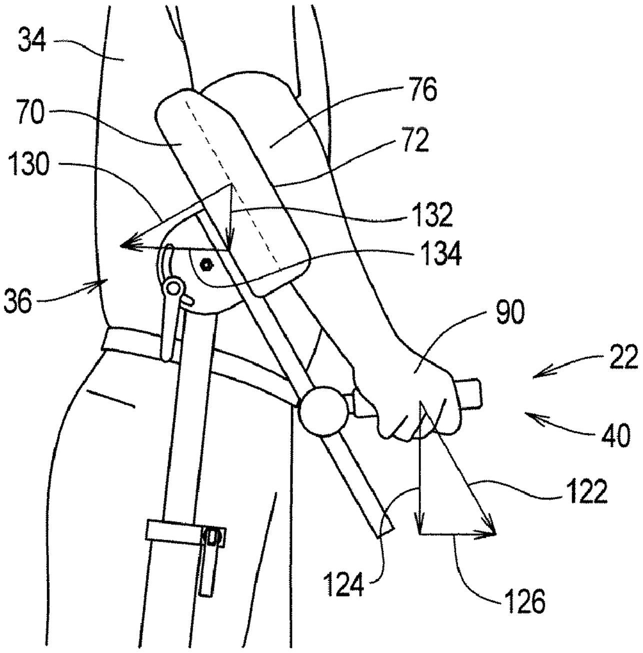
FIG. 27 shows another possible orientation of the upper body support assembly.

Now referring ahead to FIGS. 26 and 27, a force diagram is shown where the orientation of the upper body support assembly 22 in FIG. 26 produces a resultant force vector 120 somewhere along the upper contact surface 72 of the elbow pad 70. The support handle assembly 40 provides some control over the mobile support system and various loads can be exerted thereto. For example, if the individual 34 loses his or her balance rearwardly, he/she can supply a vertical force to counteract such loss of balance and the weight of the mobile support system is used to help the individual regain his footing. Further, the support handle assembly 40 also allows for lateral turning left and right by supplying a slight rotational torque about a vertical axis of the mobile support system.

Now referring to FIG. 27, a force vector 122 is shown where the vector 122 is comprised of a substantially vertically downward component 124 and a forward component 126. The vectors 124 and 126 are orthogonal to one another and are used as an analytical tool to help define our analysis. It is clear from FIG. 27 that the load exerted upon the upper body support assembly 22 has now drastically changed whereby the pitch adjustment system 36 has now distributed a substantial amount of vertical load 124 upon the support handle assembly 40. Now referring to the upper left-hand portion in FIG. 27, it can be seen that a schematic force vector 130 is positioned on the elbow pad 70. Assuming the upper contact surface 72 has a sufficiently low coefficient of friction with the skin of the forearm 76 of the individual 34, the resultant vector 130 will be substantially orthogonal to the surface 72. Therefore, the force vector 130 can be broken down to its orthogonal components 132 and 134. Therefore, it can be appreciated that if the forearm 76 is to remain static, the forward force vector 126 is approximately equal to the rearward force vector 134. It can further be appreciated that the force 132 supplying the vertical load (as well as the resultant force 130) is less than the downward force 120 as shown in FIG. 26. Therefore, the pitch adjustment system 36 allows for a redistribution of the load between the hand region 90 and the upper forearm/elbow region 76 of the user 34. This is particularly useful in a situation where the user 34 desires to redistribute the load exerting upon the mobile support system in a different manner due to the forearm skin becoming sore or any other reason. It can further be appreciated that the dynamic of the motion of the individual is somewhat changed when the upper body support assembly 22 is in the orientation as shown in FIG. 27. For example, the center of gravity of the individual 34 is positioned in a somewhat more forward region in FIG. 27. Further, the orientation of the upper body support assembly 22 in FIG. 27 is more conducive for an upright walking posture with the shoulders rotated to a more rearward position. Therefore, the user 34 or therapist can utilize the mobile support system in a manner to achieve desired walking posture for bipedal motion which is conducive for recovery from an accident or other reasons which impeded the walking and running of an individual 34.

Figure 29:
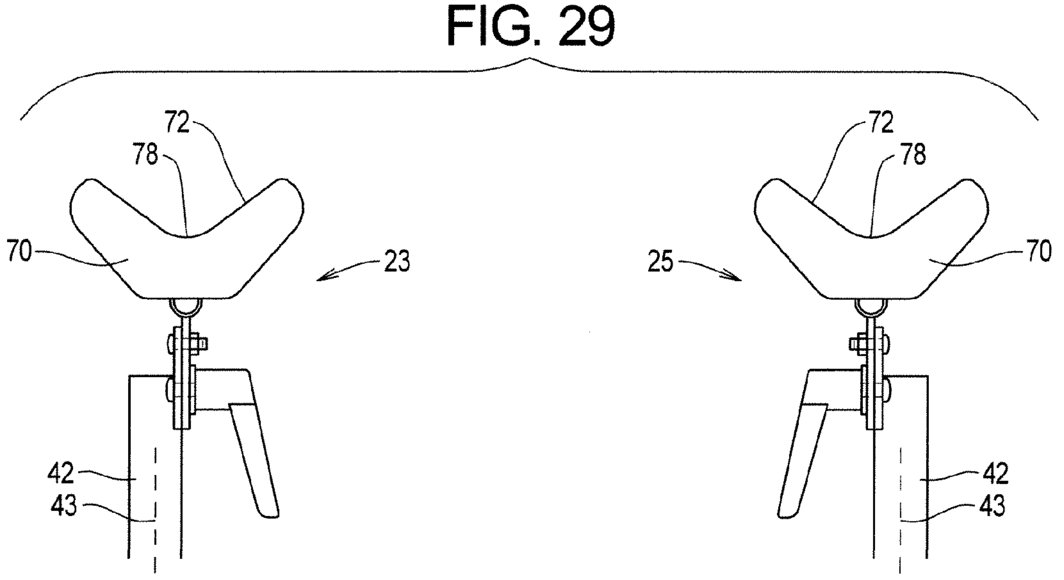
FIG. 29 shows another orientation of the left and right elbow support members where they are essentially exchanged in position to provide greater or narrower lateral width so as to accommodate a wide variety of individuals.

FIGS. 28 and 29 illustrate another element of flexibility of arranging the components of the mobile support system in one form. The orientation of the first and second support members 23 and 25 is such that the upper support surface 72 has a center valley region 73 that is positioned slightly laterally outwardly from the vertical center lines 43 of the extendable post 42. This arrangement of the first and second support members 23 and 25 is conducive for an individual who has broader shoulders or a wider girth or otherwise desires a wider elbow positioning.

Now referring to FIG. 29, it is shown that the first and second support members 23 and 25 have switched positions within the first and second base posts of the base frame. Therefore, the center valley regions 73 are positioned laterally inwardly with respect to the orientation as shown in FIG. 28, and this orientation is more conducive for an individual with narrower shoulders or otherwise desiring a narrower positioning of the elbow pads 70.

Figure 6:
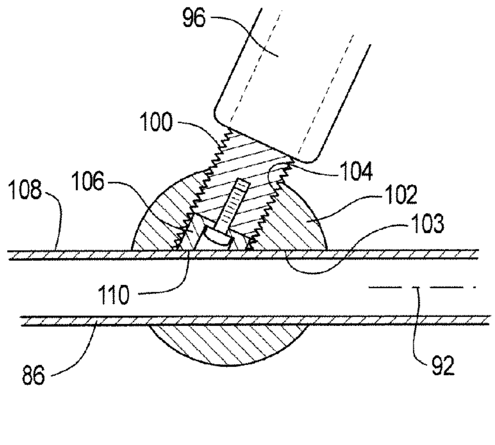
FIG. 6 is a partial sectional view of the intermediate locking member illustrating a method of locking and adjusting the support handle of the support handle assembly.

The support handle assembly 40 as shown in FIG. 5 in general is adapted to support and provide a force to the hands 90 of the individual 34 (see FIG. 1). It is desirable to have the support handle assembly adjustable to accommodate positioning and orientation of the forearm 76 of the individual 34. Further, in one form the support handle assembly is adapted to be rotated about the central axis 92 of the base region 86 as shown in FIG. 5. In general, the central axis 92 extends substantially in the longitudinal direction and in a desirable form slightly laterally inwardly and vertically downwardly in the forward region to ergonomically fit the individual 34. The support handle assembly 40 comprises a support handle 96 having an outer surface 98 adapted to be grasped by the individual 34 as shown in FIG. 1. As further shown in FIG. 5, the support handle 96 has a lower region 100 that is adapted to engage an intermediate locking member 102. In one form the support handle 96 is threadedly engaged to the intermediate locking member 102. As shown in FIG. 6, the lower portion 100 has a threaded outer surface and the locking member 102 has a female receiving threaded surface 104. A frictional engagement member 106 is attached to the lowermost region of the lower portion 100. The base region 86 has an outer surface 108 that in one form is cylindrical and adapted to engage the partially cylindrical lower surface 110 of the frictional engagement member 106. The intermediate locking member 102 has an interior cylindrical surface 103 that is adapted to be in close engagement with the outer surface 108. In one form the frictional engagement member 106 rotates with respect to the lower portion 100 and is adapted to be biasedly repositioned with respect to the intermediate locking member 102. Of course, other locking mechanisms can be employed; however, the frictional engagement of the partially cylindrical lower surface 110 and the outer surface 108 provides a great deal of flexibility whereby the support handle assembly 40 can be repositioned along the central axis 92 as shown in FIG. 5 by the phantom line indicating the handle **96*a*. Further, having a cylindrical outer surface 108 of the base region 86, and a substantially corresponding concave partially cylindrical surface 103 and 110 that is perhaps a slightly larger diameter allows for rotation of the support handle assembly 40 about the central axis 92. This is particularly useful in a situation where the user 34 as shown in FIG. 1 desires to pronate or supinate his or her hands 90. Oftentimes, a slight pronation of the hands and forearm regions 90 and 76** from the vertical handle orientation is desirable for a proper ergonomic positioning.

Figure 6A:
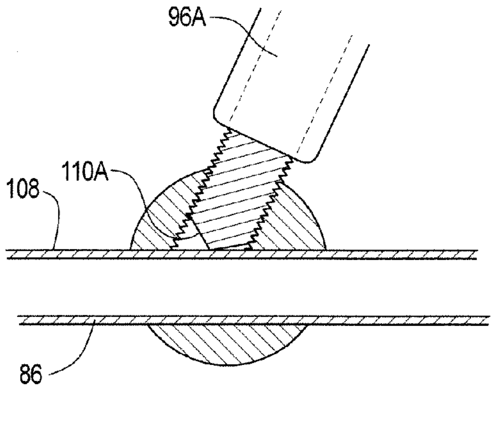
FIG. 6A shows another embodiment of the handle whereby in one form, the handle is a unitary item which can be plastic injected molded and the forward region has a conical or frustoconical obtuse angled surface to engage the outer surface of the base region of the upper body assembly.

As shown in FIG. 6A, the support handle 96A in one form has a conical or frustoconical forward surface 110A that is adapted to engage the outer surface 108 of the base number 86. In one form, the handle 96A can be of a unitary design which is made of a plastic injected molded piece.

Figure 18:
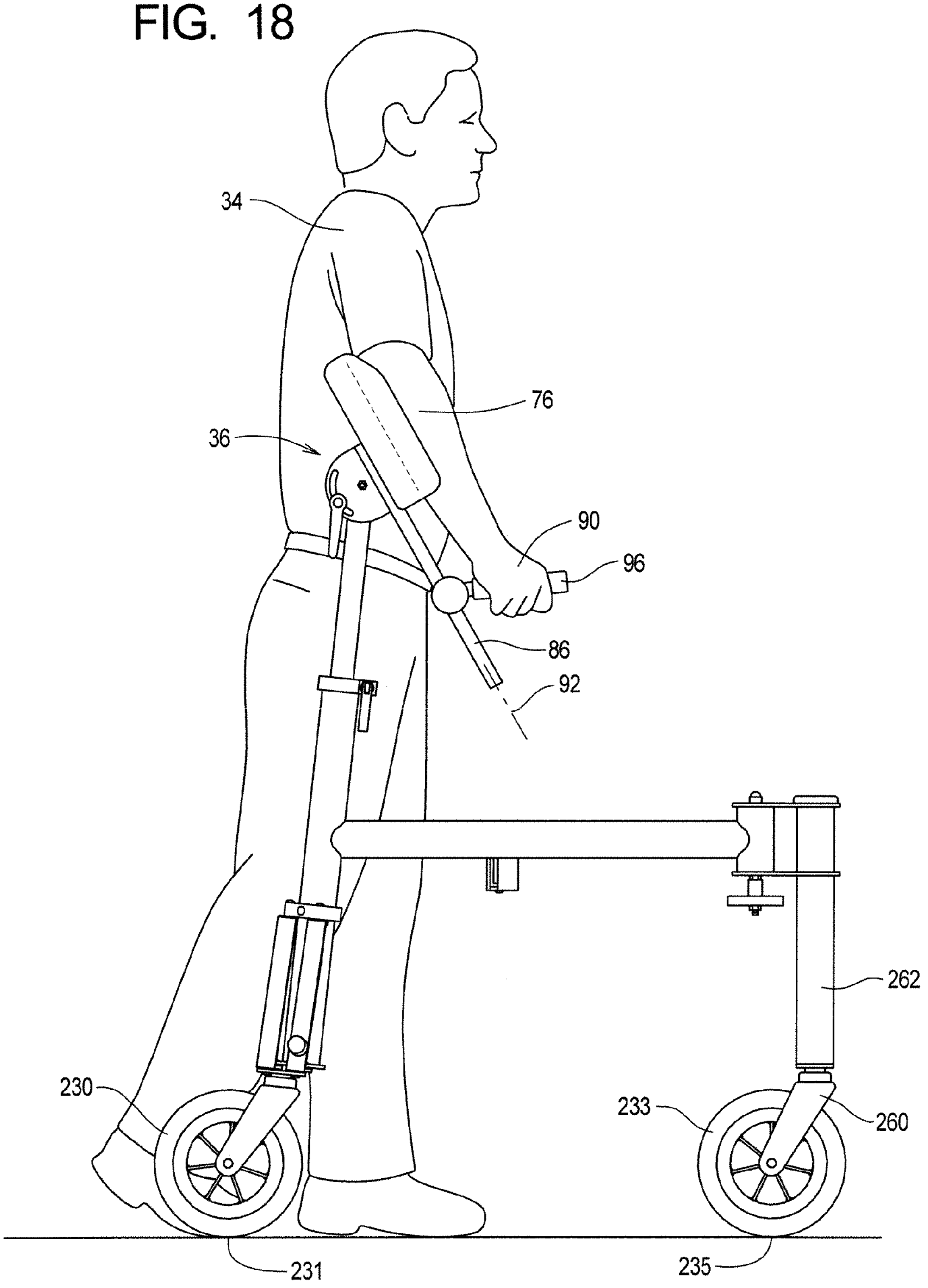
FIG. 18 shows the mobile support system in an orientation where the pitch adjustment system has adjusted the upper body assembly orientation in a manner where a greater percentage of the load from the individual exerted thereon is distributed to the support handle.

Moving ahead now to FIG. 18, the user 34 has repositioned the pitch adjustment system 36 in a manner so that the pitch angle of the central axis 92 is positioned in a lower orientation in the front region. This orientation of the elbow forearm region 76 of the user 74 allows for a greater amount of force to be applied to the support handle assembly 40. As described above with reference to FIGS. 26 and 27, the orientation of the upper body support assembly 22 can be adjusted by the individual or medical consultant.

Figures 3, 13:
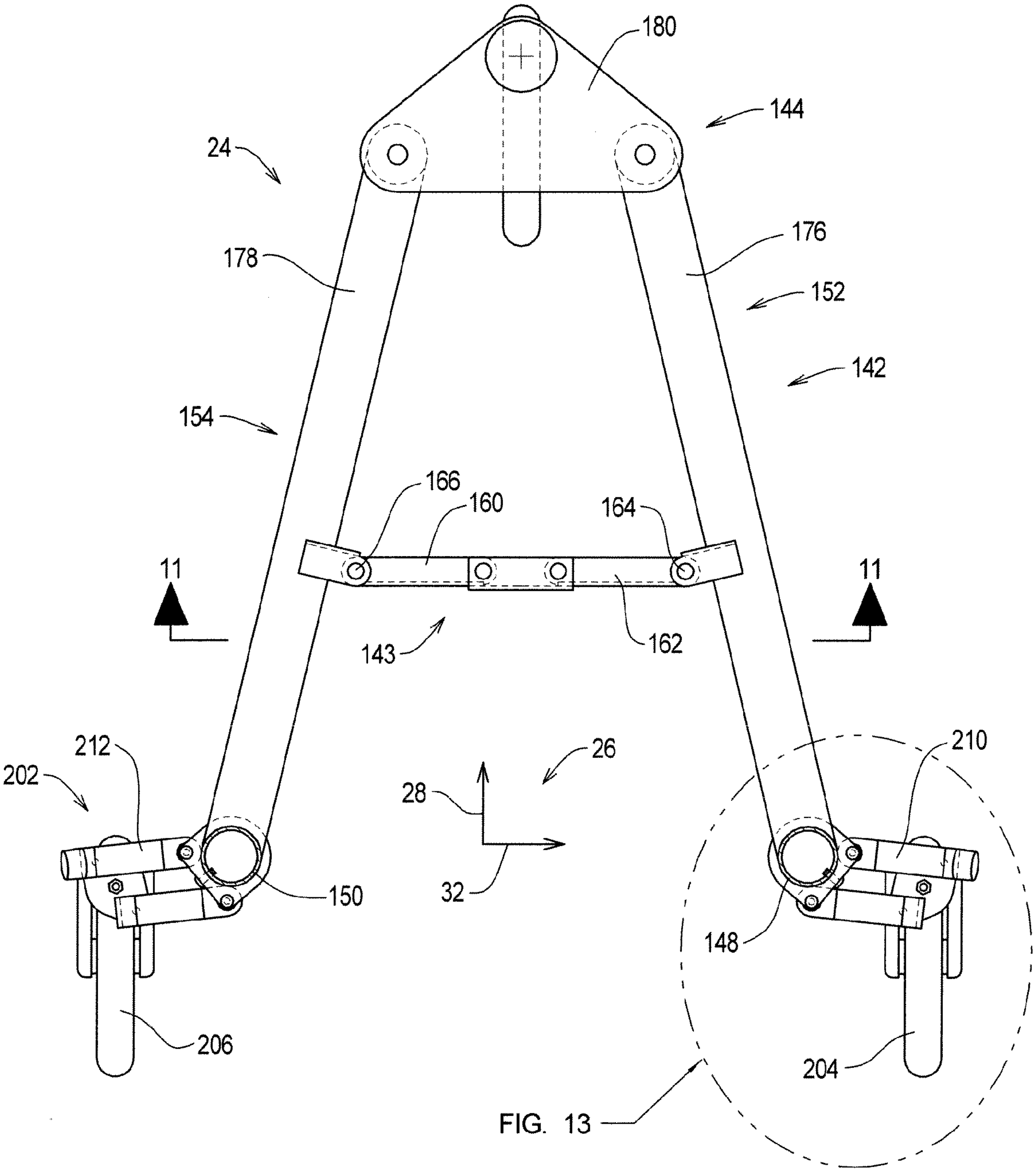
FIG. 3 is a top view of the mobile support system.
FIG. 13 is a sectional top view taken at line 13-13 of FIG. 2 showing the first laterally inward displacing device.
Figure 12:
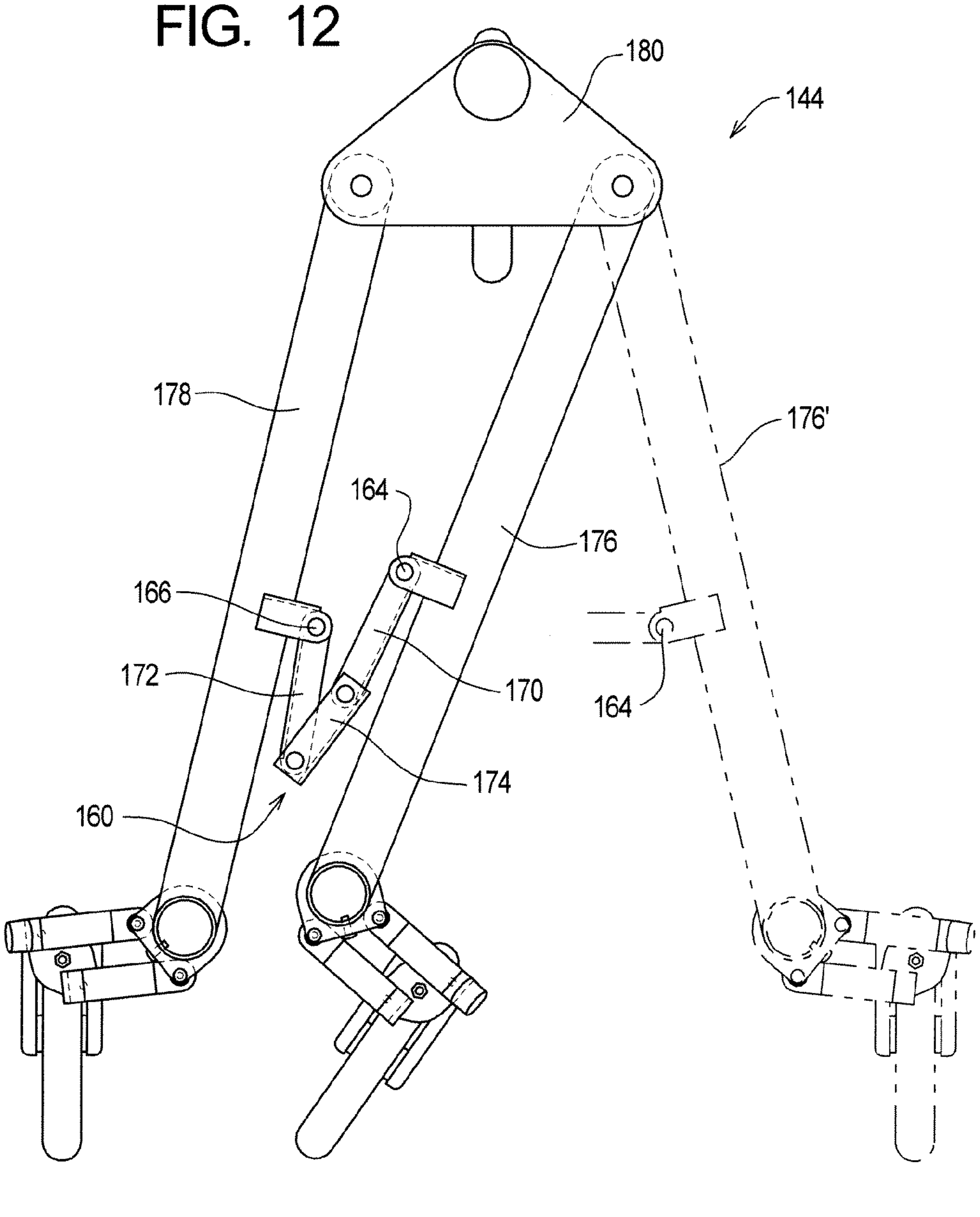
FIG. 12 is a top view of the mobile support system shown in a stored orientation.
Figure 13:
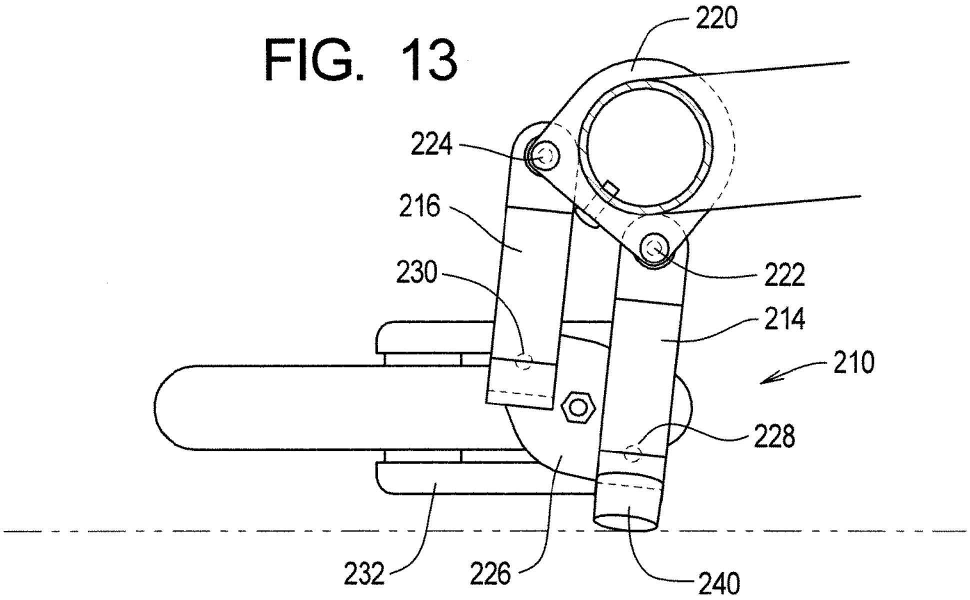

There will now be a detailed discussion of the base frame 24 with initial reference back to FIG. 1. As shown in this figure, the base frame 24 comprises a wheel assembly 140 and a frame 142. The frame 142 has a longitudinally forward region 144 and a longitudinally rearward region 146. A longitudinally medial region 143 is positioned in between the regions 142 and 144. Located in the longitudinally rearward portion 146 are first and second base posts 148 and 150 (see FIG. 3). FIG. 3 further shows the base frame 24 having a first lateral region 152 and a second lateral region 154. Located in the longitudinal medial region 143 is a laterally extending support member 160. The laterally extending support member 160 has a longitudinally rearward surface 162 and is connected at a first connection point 164 to the first lateral region and further connected to the connection point 166 at the second lateral region 154. As shown in FIG. 12, the laterally extending member 160 is adapted to be reorientated in a manner such that the connection points 164 and 166 are positioned closer to one another. In one form, the laterally extending member 160 comprises first and second intermediate linkages 170 and 172 as well as central linkage 174 that is pivotally connected thereto.

The frame 142 comprises a first lateral frame member 176 and a second lateral frame member 178. In one form, the first and second lateral frame members 176 and 178 are comprised of a tubular-like member made of aluminum having a sufficient structural moment of inertia to withstand loads and moments exerted thereon. The first and second lateral frame members 176 and 178 have a longitudinal forward region that is attached to a forward frame member 180 that is located in the longitudinally forward region 144. As shown in FIG. 12, the longitudinally forward portions of the first and second lateral frame members 176 and 178 are both or either one pivotally attached to the forward frame member 180. In one form, the second lateral frame member 178 is fixedly attached to the forward frame member 180 and the first lateral frame member 176 is pivotally attached to the forward frame member 180 whereby the base frame 24 has a first position that is an operational position which is indicated by the dashed line 176' in FIG. 12. The base frame 24 further has a closed position or storage position indicated by the dark line for the first lateral frame member 176. When the base frame is in the stored position as shown in FIG. 12 (as well as the mobile support system 20 when the first and second support members 21 and 25 are attached thereto in a manner as shown in FIGS. 28 and 29), it is particularly conducive to be stored in a more confined space such as the back seat of a vehicle or in the trunk of a car. Further, to reduce the net volume of the device and to make it less cumbersome, the first and second support members 21 and 25 that are best shown in FIGS. 28 and 29 can be removed from the base posts 148 and 150 of the base frame 24.

Figure 11:
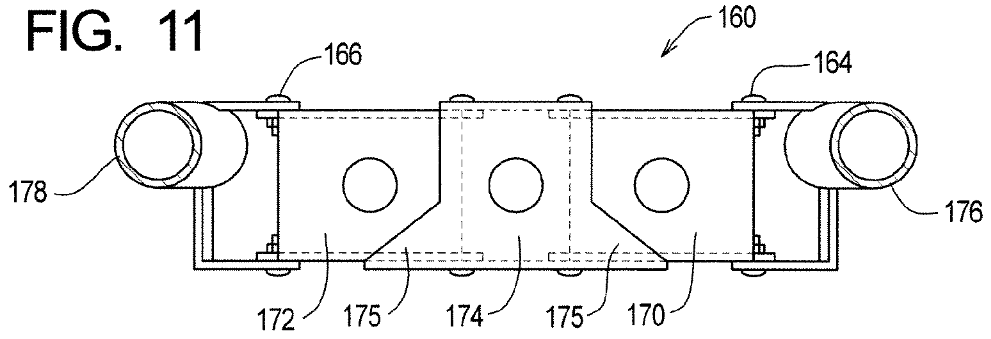
FIG. 11 is a sectional view of the laterally extending support member taken at line 11-11 in FIG. 3.

Of course a variety of laterally extending support members 160 as shown in FIGS. 3 and 12 can be employed with various linkage type assemblies. The linkage assembly as shown in this figure is conducive to allow for flexibility in the collapsing of the first and second lateral frame members 176 and 178. It should further be noted that the various members comprising the laterally extending support member 160 are constructed in one form of C-channel-like members comprising the linkages 170, 172 and 174 to maximize the structural movement of inertia of this member to minimize the rotational torques placed on the base frame 24 in operation. For example, to reduce the amount of torque about a longitudinally extending center axis of the base frame 24, having C-channel members for the linkages 170, 172 and 174 are particularly conducive for strengthening and adding rigidity to such a movement applied thereon. As shown in FIG. 11, the depth of the linkages 170, 172, and 174 are approximately twice that of the first and second lateral frame members 176 and 178 in one form. Further, it should be noted that the lower portion of the center linkage 174 has laterally extending wing portions 175 that are adapted to engage the lower surface of linkages 170 and 172 whereby this positive engagement increases the rigidity of the linkage 160.

Figure 7:
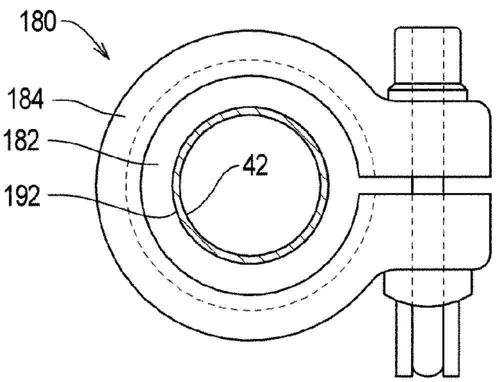
FIG. 7 is a partial sectional view of the locking mechanism adapted to adjust the upper body support assembly with respect to the base frame.
Figure 8:
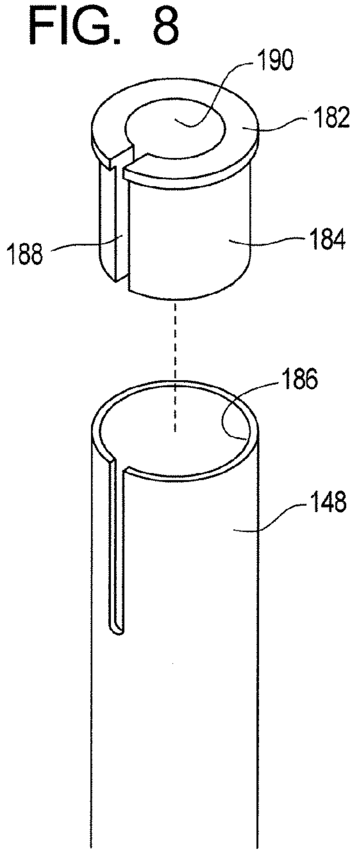
FIG. 8 is a partial exploded view of a sleeve insert adapted to engage the base post of the base frame and adjustably fix the extendable post of the upper body support assembly.
Figure 9:
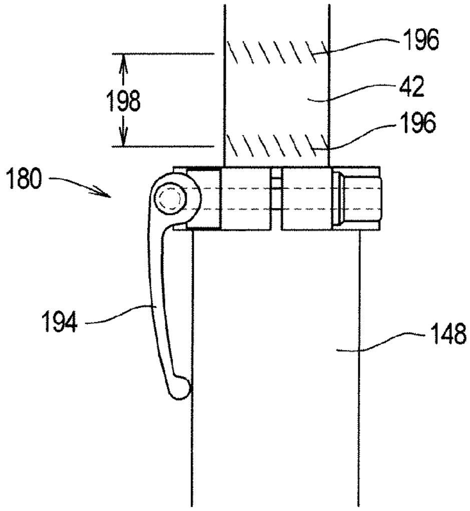
FIG. 9 is a side view of the locking mechanism in a locked position.
Figure 10:
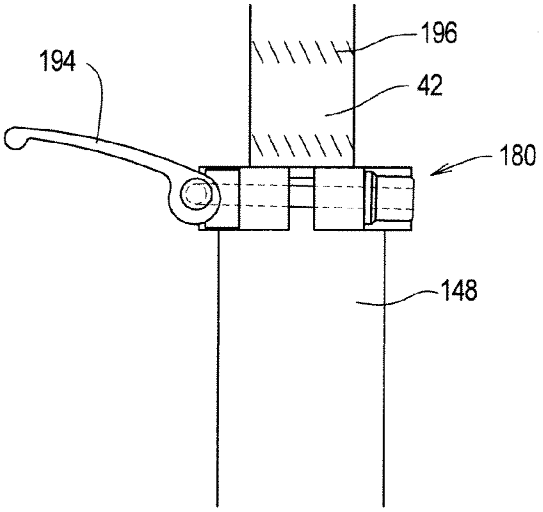
FIG. 10 is a side view of the locking mechanism in an adjustable position.

There will now be a discussion of the adjustment system of the upper body support assembly 22 with respect to the base frame 24 and with initial reference to FIGS. 7-10. As shown in these figures, the locking mechanism 143 in general is adapted to adjustably and fixedly position the extendable post 42 with respect to the base post 148. FIG. 7 shows a locking mechanism 180. In general, the locking mechanism 180 comprises a sleeve insert 182 and a circumferential restrictor 184. As shown in FIG. 8, the sleeve insert 182 has an outer surface 184 that is adapted to engage the inner surface 186 of the base post 148. The sleeve insert 182 further comprises a slotted region 188 adapted to allow circumferential restriction of the sleeve insert 182 so the net circumference decreases of the inner conical surface 190. The inner conical surface 190 is adapted to frictionally engage the outer conical surface 192 of the extendable post 42 as shown in FIG. 7. In one form, the circumferential restrictor 184 is a common latch assembly having a latch 194 as shown in FIGS. 9 and 10. This quick release latch assembly that is well-known in the industry is particular conducive for rapidly adjusting the circumferential restriction to frictionally engage the base post 148 to the extendable post 42. However, in one form the extendable post 142 is comprised of vertically spaced gnarled regions 196 that are spaced at vertical increments indicated at 198 in FIG. 9. In general, the vertically spaced gnarled regions 196 allow for a rough region where the inner surface 190 of the sleeve insert 182 can get a better frictional engagement thereof. Further, having the gnarled regions spaced at intervals indicated at 198 is conducive for ensuring that the first and second extendable posts 42 (where the second extendable post is not shown but adapted to engage the base post 150 shown in FIG. 3) can be more easily adjusted to the same height, whereby the number of gnarled regions that are visible to the individual assist in ensuring that the first and second upper body supports 27 and 29 are at equal heights with respects to the base frame 24. Further, a numbering system or other increment type measuring system can be etched into the gnarled region 196 so as to make it possible to quickly identify which gnarled section is in engagement with the locking mechanisms 180.

There will now be a discussion of the wheel assembly 140 with reference to FIGS. 2, 13-17, and FIG. 25. As shown in FIG. 2, the wheel assembly 140 comprises a longitudinally forward wheel subassembly 200 and a longitudinally rearward wheel subassembly 202. As shown in FIG. 3, the longitudinally rearward wheel subassembly 202 comprises a first rearward wheel 204 and a second rearward wheel 206. The first and second rearward wheels comprise in one form a laterally inward displacing device that is shown in FIGS. 13-17. For purposes of economy of description, the first laterally inward displacing device 210 will be described in detail with the understanding that the description is relevant to the second laterally displacing device 212 as shown in FIG. 3.

As shown in FIG. 13, the first laterally inward displacing device 210 comprises a forward linkage 214 and a rearward linkage 216. The forward and rearward linkages are pivotally connected to a base region 220 at connection points 222 and 224 respectively. The laterally inward displacing device 210 further comprises a wheel carriage 226 that is pivotally connected to the forward and rearward linkages 214 and 216 at pivot point connections 228 and 230. In a preferred form the arrangement of the connection points 222, 224, 228 and 230 are of a parallelogram nature so the carriage 226 only has translation of movement and little to no rotation about a vertical axis. In other words, the distance between points 222 and 224 is the same as the distance between 228 and 230 as shown in FIG. 13. Further, the center of rotation of points 222 and 228 are the same distance apart as that of the center of rotation of points 224 and 230. Of course in some embodiments it may not be necessary to have translation of movement with the carriage member 226. However, as described further herein, in one form it is desirable to have the first and second rearward wheels track straight ahead along the path of travel without rotation where the U-shaped casing 232 is rigidly attached to the wheel carriage 226.

Figure 14:
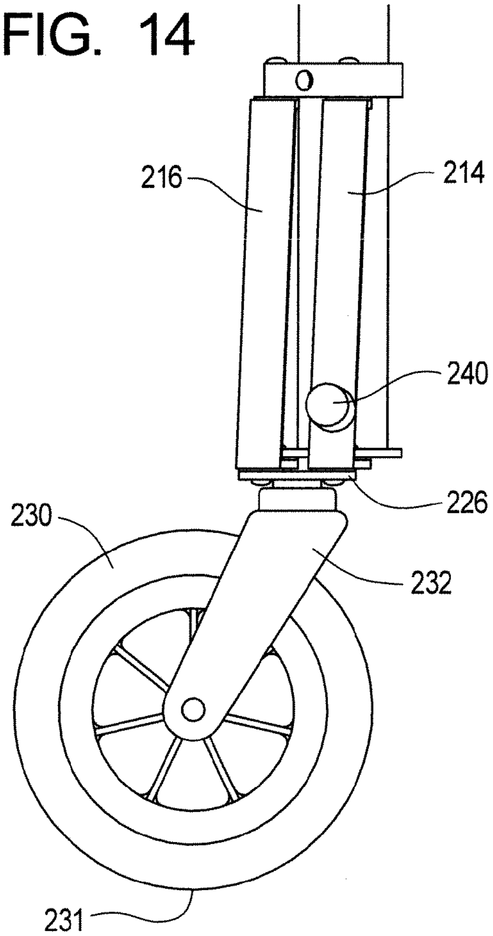
FIG. 14 is a side view of the laterally inward displacing device shown in a laterally outward orientation.

As shown in FIG. 14, the forward and rearward linkages 214 and 216 extend vertically and taper laterally inwardly from the lower portion to the upper portion. By having linkages that extend vertically, any load that is exerted vertically approximately upon the center of the wheel carriage 226 is more adapted to be handled without a large bending movement acting upon the linkages 214 and 216.

Figure 16:
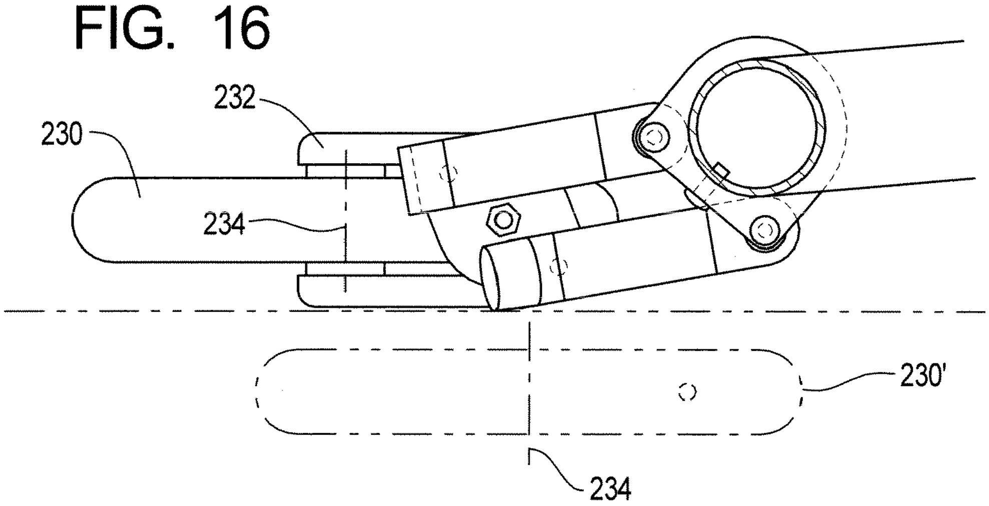
FIG. 16 shows the first laterally inward displacing device in a laterally inward position.

The first rearward wheel 230 is attached to the U-shaped casing 232 about an axis of rotation 234 as shown in FIG. 16. The first rearward wheel 230 (which of course is the same as the second rearward wheel not shown) has a ground engagement location 231 at the lower region with respect to the U-shaped member 232 which is defined as the area of contact of the wheel 230 as it rolls along and engages the ground. Of course the forward wheel 233 as shown in FIG. 18 has a ground engagement location 235. In general, the ground engagement locations of the forward and rearward wheels are such to form a triangular orientation. Where more than one wheel is used in the forward region, it is desirable to have these forward wheels laterally positioned inwardly with respect to the two rearward wheels. In one form, the U-shaped casing 232 is rigidly attached to the wheel carriage 226. The U-shaped casing and the rearward wheel are adapted to reposition from the position indicated by the dashed line 230' in FIG. 16 to the solid line 230, whereby the impact/engagement 240 that is positioned in the more forward region of the laterally inward displacing device 210 and preferably attached to the forward linkage 214 is adapted to engage external objects such as the perimeter frame region of a doorway. Therefore, it can be appreciated that the laterally inward displacing devices 210 that are positioned on both sides of the mobile support system 20 (as shown in FIG. 1) allow for a wider operating position where the ground engagement locations 231 are positioned laterally wider for additional stability and support, and when approached by a narrow passageway of some sort, the rearward wheels 230 are adapted to position laterally inwardly.

Figure 15:
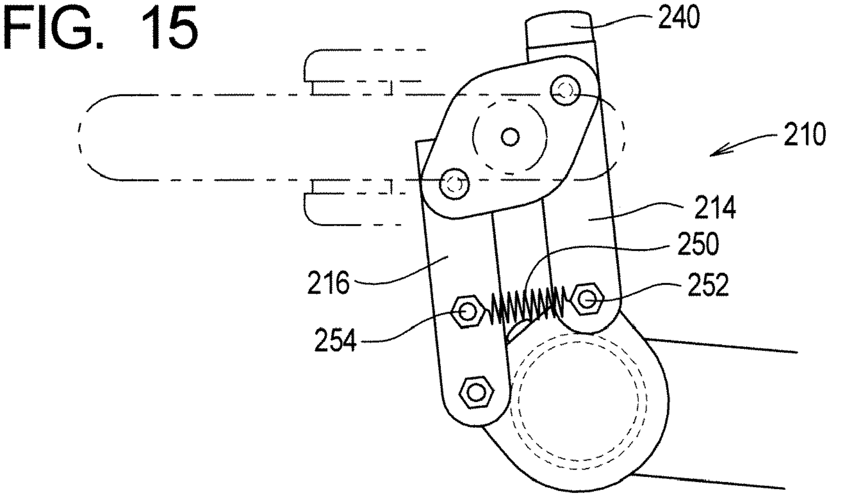
FIG. 15 is a partial schematic bottom view looking upwardly illustrating the first laterally inward displacing device orientated in a laterally outward orientation with the forward and rearward linkages positioned partially in the lateral direction.
Figure 17:
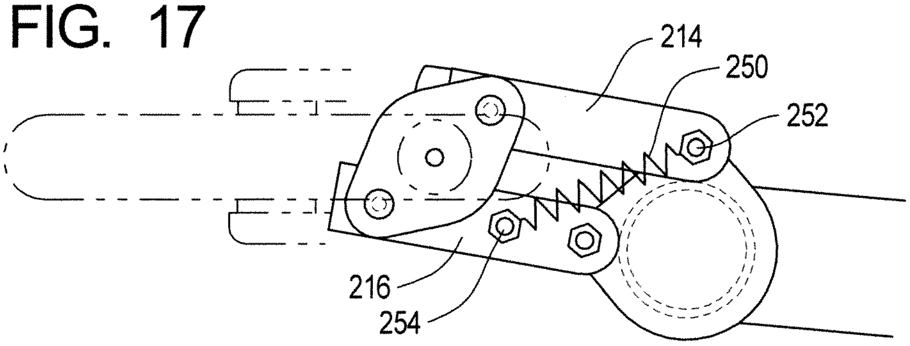
FIG. 17 shows the first laterally inward displacing device from a bottom view where the biasing member is extended in a retracted position and adapted to reposition the forward and rearward linkages to an orientation as shown in FIG. 15.

As shown in FIGS. 15 and 17, the laterally displacing device 210 is shown from a bottom view whereby a biasing member 250 is shown that is connected to the forward and rearward linkages 214 and 216 in a manner so that when the laterally inward displacing devices 210 are orientated in a manner as shown in FIG. 17, the biasing member 250 is extended and the engagement locations 252 and 254 are separated with respect to the orientation as shown in FIG. 15. This allows for the laterally inward displacing device 210 to be orientated in a laterally outward position as shown in FIG. 15, and when an external force biases the forward and rearward linkages 214 and 216 in the laterally inward orientation as shown in FIG. 17, the biasing member 215 repositions the linkage assembly in a manner as shown in FIG. 15 when the external force is not present.

FIG. 18 shows the forward wheel 233 attached to the U-shaped member 260 which is pivotally attached to the forward post 262. The forward wheel 233 has a forward ground engagement point that is positioned laterally inwardly with respect to the first and second longitudinally rearward ground engaging points 231.

Figure 25:
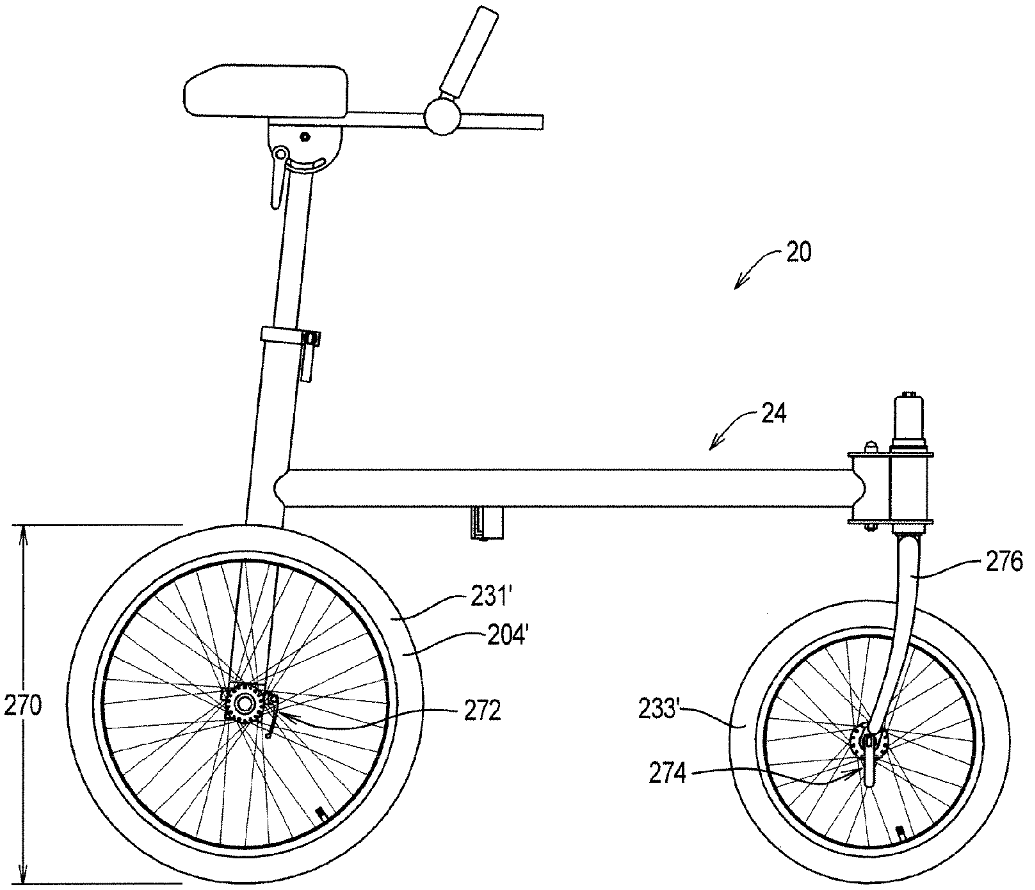
FIG. 25 shows another embodiment of the mobile support system whereby larger all-terrain wheels are provided.

Now referring ahead to FIG. 25, there is shown another variation of the mobile support system 20 whereby the first rearward wheel 204' is of a sportier design whereby the rearward wheel 231' has a diameter 270 that is larger and more adapted for an unpredictable ground environment such as trail running or the like. The diameter 270 can be between 8 inches and 20 inches in the broader scope and a diameter of approximately 14 inches is of a desirable size to overcome many types of obstacles. The variation as shown in FIG. 25 is in general a sportier model and in one form the rearward wheel 231 (of course there are first and second rearward wheels, but only the first rearward wheel on the first lateral side is shown in this figure) is directly attached to the base frame 24. A quick release system 272 which is similar to the locking mechanism 180 as shown in FIGS. 9 and 10 can be employed where the first rearward wheel 204 (which of course is similar to the second rearward wheel not shown in this figure) is directly attached to the base frame 24. The forward wheel 233' has a similar locking system 274 that is attached to the front fork 276. The front fork and locking system 274 are similar to others in the industry in such that it is advantageous to remove the forward wheel 233' to store the mobile support system in a confined area such as the trunk of a car or to reduce the net volume for purposes of shipping or otherwise transporting the mobile support system.

Figure 19:
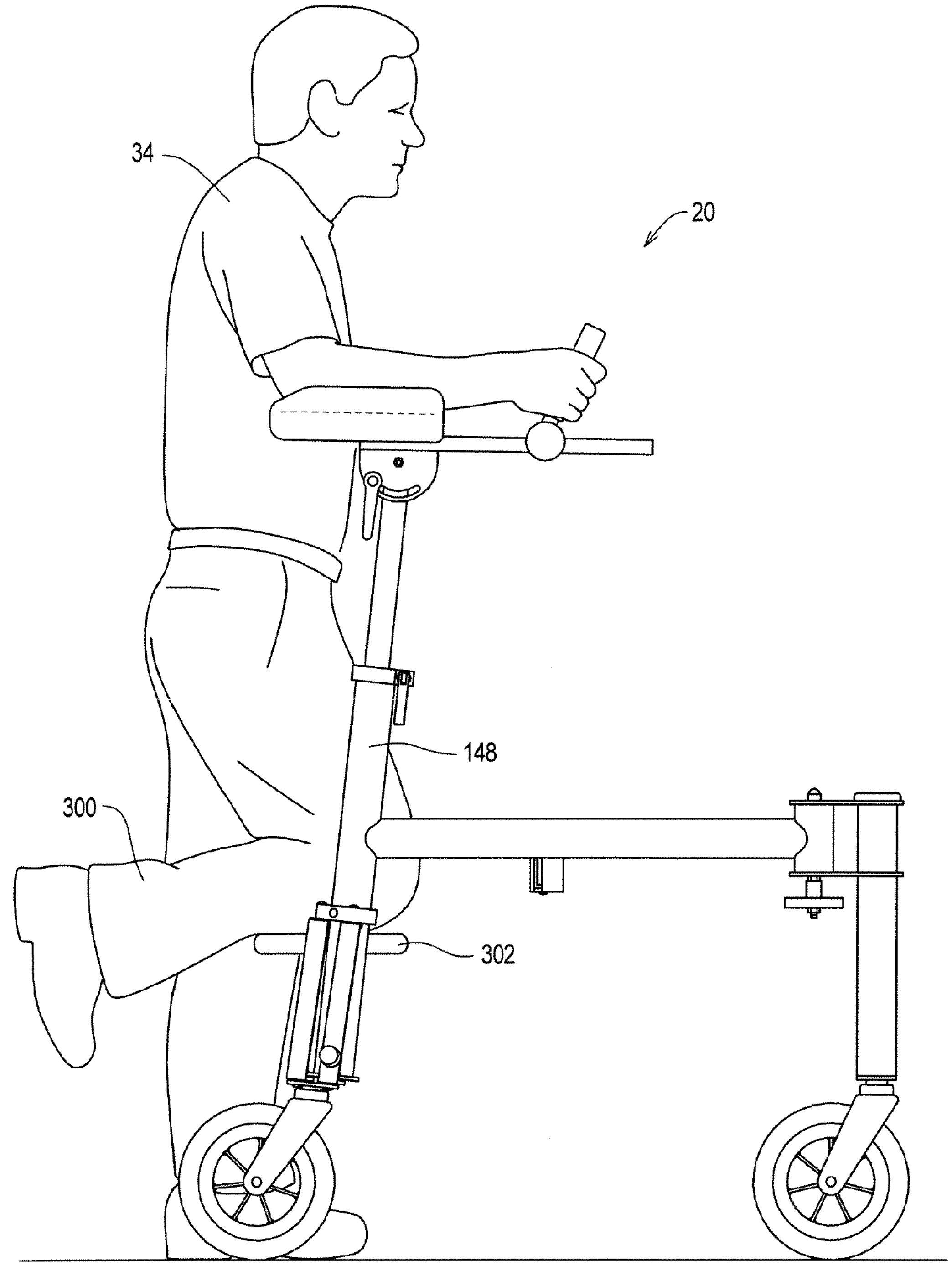
FIG. 19 shows an alteration whereby a limb support is provided to support the lower limb of the individual.

Now referring to FIGS. 19-24, there are shown various modifications and additions to the mobile support system 20 to suit particular needs of the individual 34. FIG. 19 shows the individual 34 where the right leg 300 is supported on a limb support 302. In one form, the support pad 302 is fixedly attached to the base post 148. The limb support 302 can be attached to the base post 148 by any variety of foreseeable connecting mechanisms; further, the limb support 302 can be an aftermarket type purchase that is retrofitted to a mobile support system 20 on an as-needed basis depending upon the needs of the individual 34.

Figure 20:
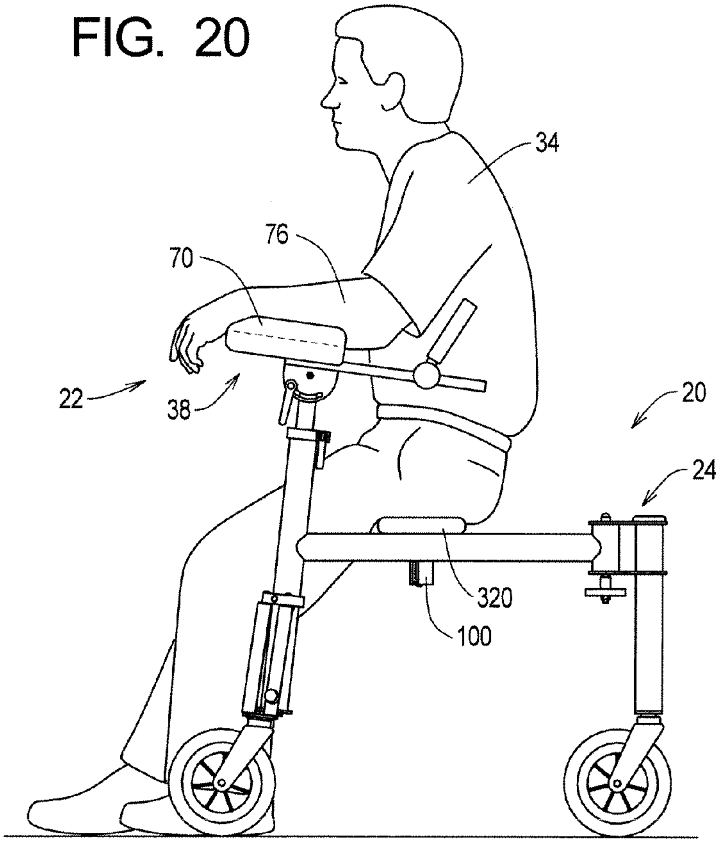
FIG. 20 shows another modification whereby the mobile support system has a seat attachment that is in one form attached to the laterally extending support member and is adapted to support an individual.
Figure 21:
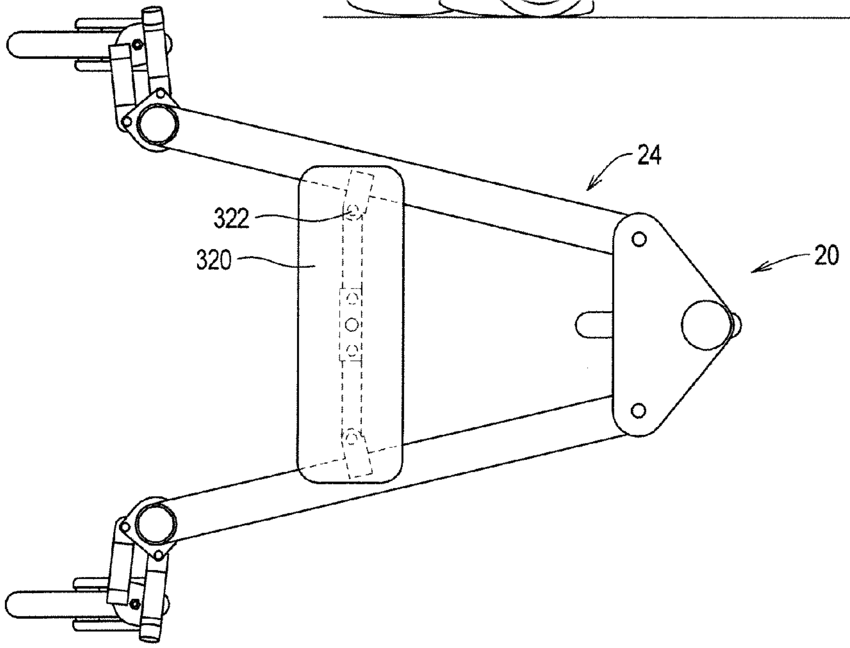
FIG. 21 is a top view of the mobile support system with the seat attachment attached thereto.

FIGS. 20-21 show another modification whereby a seat attachment 320 is provided. The seat attachment 320 has a lower surface that is adapted to rest upon the laterally extending support member 100. The laterally extending support member 100 can be provided with an engagement type slot whereby an extension of the seat attachment 320 is adapted to engage such a slot. Further, the seat attachment 320 can be repositioned vertically so the laterally extending support member 100 can be reconfigured into the stored/closed position as shown in FIG. 12. In one form, the seat attachment 320 can be pivotally attached at location 322 and adapted to be vertically displaced and rotated therefrom. In other words, as the seat attachment 320 is positioned vertically with respect to the base frame 24, the seat attachment 320 rotates about the vertical axis of connection point 322 to be substantially aligned in the longitudinal direction for storage purposes. It should be further noted that as shown in FIG. 20, the elbow support region 38 is well-suited to rest the forearms 76 of the individual 34. Of course the upper body support assembly 22 can be adjusted in a manner as described above whereby the heights of the elbow pad 70 are adjusted so as to provide a proper ergonomic position for the individual 34.

Figure 22:
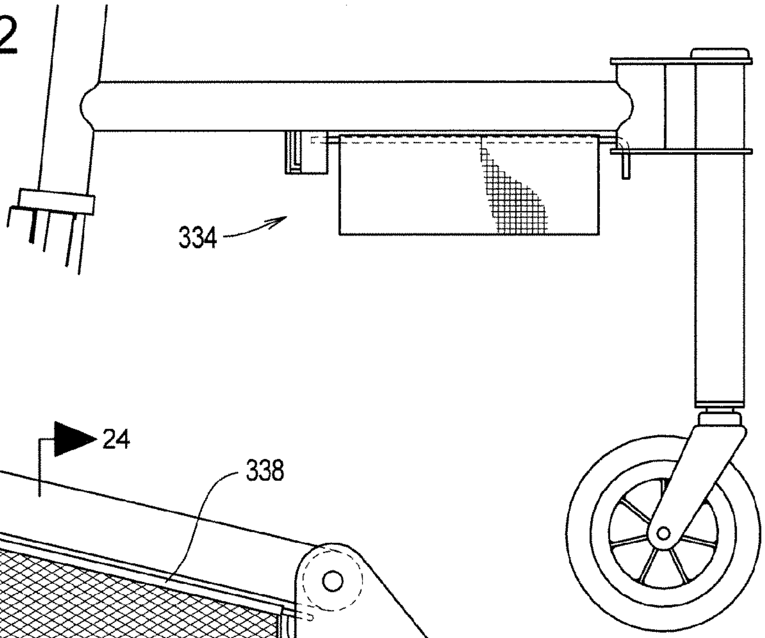
FIG. 22 shows another variation whereby a basket area is provided and is adapted to hold objects and personal items therein.
Figure 23:
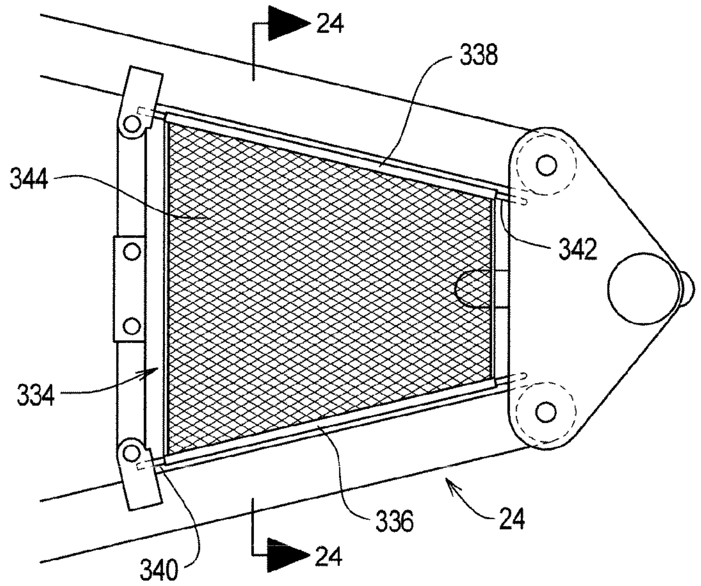
FIG. 23 is a top view of the basket region.
Figure 24:
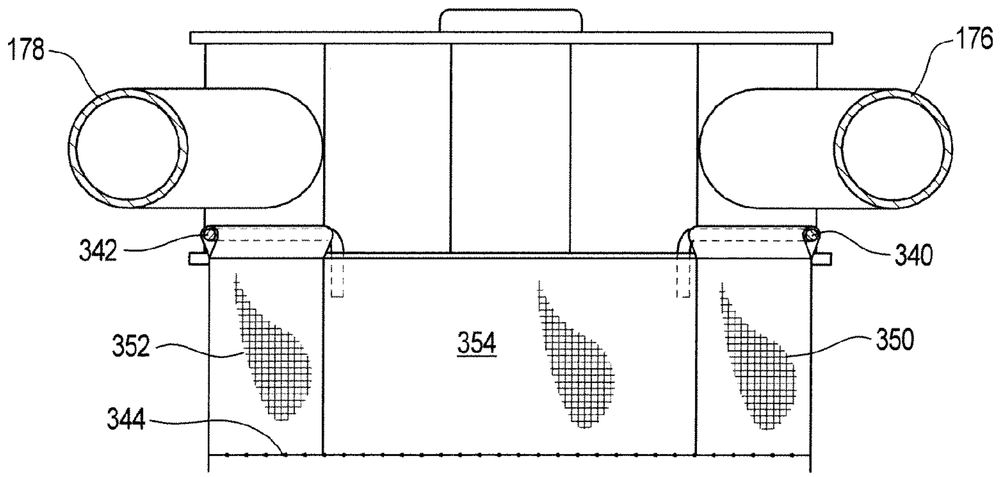
FIG. 24 is a sectional view taken at line 24-24 of FIG. 23 showing the basket area cross-sectionally.

As shown in FIGS. 22-24, a basket area 334 is provided. As shown in FIG. 23, the basket area 334 has first and second lateral regions 336 and 338. The first and second lateral regions 336 and 338 are attached to support rods 340 and 342 that have forward and rearward ends that are attached to the base frame 24. In one form, the central region 344 is made from a mesh-like material that is lightweight and adapted to have particulate matter such as sand and dirt pass therethrough. The basket area 334 is well-suited to hold particular items of interest to the individual using the mobile support system. Such items that can be contained therein are oxygen if this is a necessary component for the individual, or other items of convenience such as bags, towels, food and drink, a purse, etc. FIG. 24 indicates that the central region 344 can rest substantially below the first and second lateral frame members 176 and 178. The basket can further be provided with first and second lateral side walls 350 and 352 to define a central chamber region 354 adapted to hold items of interest therein.

Figure 30:
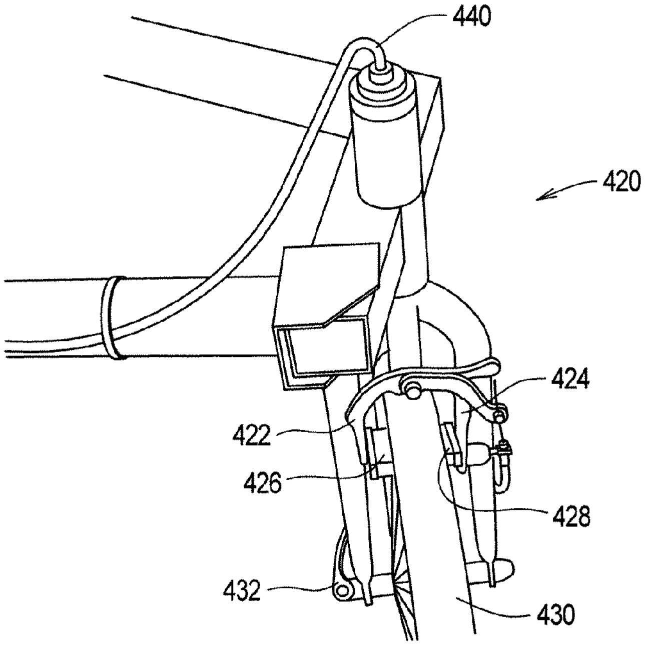
FIG. 30 is an isometric view of a braking system that can be employed in the front tire of the mobile support system.

As shown in FIG. 30, there is another embodiment where a break system 420 is employed. The brake system has first and second clamping members 422 and 424. The brake system can be a common type of breaking apparatus that is well-known in the art. An extension from the cable can disconnect whereby the frictional engagement members 426 and 428 separate rearwardly greater than the lateral width of the front tire 430 whereby the front clamping mechanism 432 can allow the front tire to be disengaged from the fork assembly. The breaking system 420 is in operational engagement with the control line 340.

Figure 31:
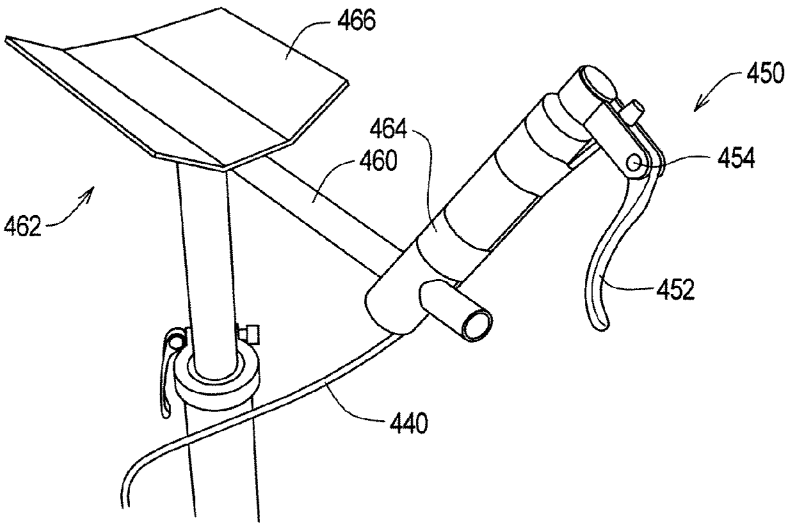
FIG. 31 shows a handbrake system that can be employed in conjunction with the braking system as shown in FIG. 30.

As shown in FIG. 31, the line 440 is attached to a brake handle system 450 that has a brake lever 452 that is adapted to pivot about the pivot pin 454 and exercise some mechanical leverage to extend an internal cable within the control line 440 to operate the brake system 420 is shown in FIG. 30. In one form, the control line can be discreetly placed within the base member 460. The upper body support system 462 in one form can be a rigid embodiment whereby the handle 464 and elbow support 466 are at a fixed position and are not adjustable.

Therefore, it can be appreciated that the above noted modifications can be used individually or in combination for a variety of arrangements to suit the needs of the individual 34.

Therefore I claim:

1. A mobile support system having a longitudinal, vertical and lateral axis adapted to support an individual having at least one leg, left and right elbows and left and right hands, the mobile support system comprising:

a) a base frame comprising a first lateral frame member and a second lateral frame member, the first and second lateral frame members forming a central unobstructed region adapted to provide free motion of the leg of the individual, b) a wheel assembly attached to the base frame and comprising a longitudinally rearward wheel subassembly and a longitudinal forward wheel subassembly, where the longitudinally rearward wheel subassembly comprises first and second longitudinally rearward wheels each having ground engagement locations, the longitudinally forward wheel subassembly having a ground engagement location that is positioned laterally between the ground engagement locations of first and second longitudinally rearward wheels, the base frame comprising left and right lateral regions which are movably attached to a forward frame member where the left and right lateral regions have an operating orientation where the left and right lateral regions are spaced apart sufficiently to have an individual interposed there between, the left and right lateral regions having a storage orientation where the left and right lateral members are operatively configured to pivot substantially about a vertical axis, reducing an overall volume of the mobile support system, whereby when the mobile support system is in the storage orientation the first lateral frame member is positioned closer in proximity in the lateral direction to the second lateral frame member, c) an upper body support assembly attached to the base frame, the upper body support assembly comprising:

i. an elbow support region comprising first and second elbow supports adapted to support the left and right elbows of the individual, ii. a support handle assembly comprising first and second support handles operatively configured to be grasped by left and right hands, iii. where the first and second elbow supports and the first and second handles are connected to the left and right lateral regions respectively, d) whereas the body weight of the individual is operatively configured to be partially supported by the upper body support assembly whereby a portion of the weight is distributed to the elbow support region and a portion of the weight is distributed to the support handle assembly.

2. The mobile support system as recited in claim 1 where the first and second support handles are engaged to the base region by an intermediate locking member, whereby the support handle has a lower region that is threadedly engaged to an open recess of the intermediate locking member's lowermost region of the support handle and engages the outer surface of the base region to fixedly and temporarily position the support handle assembly to the base region.

3. The mobile support system as recited in claim 2 whereby the base region is cylindrical and the intermediate locking member has a substantially longitudinally extending cylindrical cavity whereby the intermediate locking member can rotate about the central axis of the base region.

4. The mobile support system as recited in claim 1 whereby the upper body support assembly comprises an extendable post telescopically engaged to a base post of the base frame whereby a locking mechanism is adapted to fix the extendable post with respect to the base post to adjust the height of the upper body support assembly in relation to the base frame.

5. The mobile support system as recited in claim 1 whereby the upper body support assembly comprises a pitch adjustment system to vary the loads acting thereon between the elbow support region and the support handle assembly the pitch adjustment system configured to vary the angle between the upper body support assembly and the base frame.

6. The mobile support system as recited in claim 5 whereby the pitch adjustment system comprises a pivot location and a partially circular slot and an engagement member having a handle region where the engagement member has a first location that is attached to the base frame.

7. The mobile support system as recited in claim 6 where the handle region is adapted to supply a rotational torque and frictionally engage the perimeter region of the partially circular slot.

8. The mobile support system as recited in claim 1 where the longitudinally rearward wheel assembly is comprised of a laterally inward displacing device that is adapted to reposition the first and second longitudinally rearward wheels laterally inwardly when biased by an external force.

9. The mobile support assembly as recited in claim 8 where the laterally inward displacing device of the longitudinally rearward wheel assembly is comprised of a four bar linkage assembly having a forward linkage and a rearward linkage that are both pivotally attached to the base frame and first and second wheel carriages of the first and second longitudinally rearward wheels, such that when the wheel carriage is repositioned laterally, the first and second wheel axes of rotation remain substantially aligned in the lateral direction.

10. The mobile support system as recited in claim 1 where when the mobile support system is repositioned to the storage orientation only one of the lateral regions of the frame member rotate about a substantially vertical axis relative to the forward frame member about the forward frame member.

11. The mobile support system as recited in claim 1 where the base frame comprises a laterally extending support member having an upper surface that is adapted to support the individual.

12. The mobile support system as recited in claim 1 where the first and second longitudinally rearward wheels have a diameter that is greater than eight inches.

13. A method of transporting an individual having a bodyweight and center of gravity, at least one leg, left and right elbows and left and right hands, the method comprising:

a) retrieving a mobile support system having a longitudinal axis and lateral axis adapted to support an individual, the mobile support system comprising a base frame comprising a first lateral frame member and a second lateral frame member, the first and second lateral frame members forming a central unobstructed region adapted to provide free motion of the legs of the individual when the mobile support system is in an open orientation, a wheel assembly attached to the base frame and comprising a longitudinally rearward wheel subassembly and a longitudinal forward wheel subassembly, where the longitudinally rearward wheel subassembly comprises first and second longitudinally rearward wheels each having ground engagement locations, the longitudinally forward wheel subassembly having a ground engagement location that is positioned laterally between the ground engagement locations of first and second longitudinally rearward wheels; an upper body support assembly attached to the base frame, the upper body support assembly having an elbow support region comprising first and second elbow supports adapted to support the left and right elbows of the individual and a support handle assembly comprising first and second support handles adapted to be grasped by left and right hands, b) positioning the body weight of the individual in a manner to be partially supported by the upper body support assembly whereby a portion of the weight is distributed to the elbow support region and a portion of the weight is distributed to the support handle assembly to distribute a portion of the individual's body weight thereon, c) mobile support system being arranged so the first and second lateral frame members further having a storage orientation where the first and second lateral members collapses reducing an overall volume of the mobile support system and when the mobile support system is positioned in a storage orientation following a the transporting of the individual, the first lateral frame member is positioned closer in proximity in the lateral direction to the second lateral frame member by way of relative rotation of the first and second frame members about an axis substantially orthogonal to the longitudinal axis and lateral axis and the total lateral width of the mobile support system is reduced.

14. The method as recited in claim 13 whereby the upper body support assembly is extended by an extendable post telescopically engaged to a base post of the base frame whereby a locking mechanism is adapted to fix the extendable post with respect to the base post to adjust the height of the upper body support assembly.

15. The method as recited in claim 13 whereby the upper body support assembly comprises a pitch adjustment system to vary the loads acting thereon between the elbow support region and the support handle assembly.

16. The method as recited in claim 13 where the longitudinally rearward wheel assembly is comprised of a laterally inward displacing device that is adapted to reposition the first and second longitudinally rearward wheels laterally inwardly when biased by an external force.

17. The method as recited in claim 16 where the laterally inward displacing device of the longitudinally rearward wheel assembly is comprised of a four bar linkage assembly having a forward linkage and a rearward linkage that are both pivotally attached to the base frame and first and second wheel carriages of the first and second longitudinally rearward wheels, such that when the wheel carriage is repositioned laterally, the first and second wheel axes of rotation remain substantially aligned in the lateral direction.

18. The method as recited in claim 13 where when the mobile support system is positioned in a storage orientation following a the transporting of the individual the mobile support system is placed in a vehicle for transporting.

19. A mobile support system having a longitudinal and lateral axes operatively configured to support an individual having at least one leg, left and right elbows and left and right hands, the mobile support system comprising:

a) a base frame comprising a first lateral frame member and a second lateral frame member, the first and second lateral frame members forming a central unobstructed region adapted to provide free motion of the leg of the individual when the base frame is in an open orientation, b) a wheel assembly attached to the base frame and comprising a longitudinally rearward wheel subassembly and a longitudinal forward wheel subassembly, where the longitudinally rearward wheel subassembly comprises first and second longitudinally rearward wheels each having ground engagement locations, the longitudinally forward wheel subassembly having a ground engagement location that is positioned forwardly and laterally between the ground engagement locations of first and second longitudinally rearward wheels, c) an upper body support assembly attached to the base frame, the upper body support assembly comprising:

i. an elbow support region comprising first and second elbow supports adapted to support the left and right elbows of the individual, ii. a support handle assembly comprising first and second support handles adapted to be grasped by left and right hands, iii. whereby the elbow support region is operatively configured to reposition the first and second elbow supports to fixedly and adjustably rotate about a substantially lateral axis with respect to the base frame so as to modify the angle of the first and second elbow supports to adjust the amount of pressure upon first and second support handles by the individual;

d) whereas the body weight of the individual is operatively configured to be partially supported by the upper body support assembly whereby a portion of the weight is distributed to the elbow support region and a portion of the weight is distributed to the support handle assembly and the mobile support system has a storage orientation where the first lateral frame member is positioned closer in proximity in the lateral direction to the second lateral frame member and the first lateral frame member and the second lateral frame member are configured to be repositioned to bring the first and second lateral frame members in closer proximity to one another in a stored orientation.

20. The mobile support system as recited in claim 19 whereby the upper body support assembly comprises an extendable post telescopically engaged to a base post of the base frame to adjust the height of the upper body support assembly in relation to the base frame and vertically spaced regions are positioned on the extendable post to indicate the height of the upper body support assembly with respect to the base frame.

* * * * *